US008195656B2

(12) United States Patent
Grasset (10) Patent No.: US 8,195,656 B2
(45) Date of Patent: Jun. 5, 2012

(54) SOCIAL NETWORK SEARCH (75) Inventor: Nicolas Grasset, Solna (SE)

(73) Assignee: Yahoo, Inc., Sunnyvale, CA (US)

( * ) Notice: Subject to any disclaimer, the term of this patent is extended or adjusted under 35 U.S.C. 154(b) by 366 days.

(21) Appl. No.: 12/030,715

(22) Filed: Feb. 13, 2008

(65) Prior Publication Data

US 2009/0204601 A1    Aug. 13, 2009

(51) Int. Cl.
G06F 7/00        (2006.01)
G06F 17/30       (2006.01)
(52) U.S. Cl. ........................................... 707/732
(58) Field of Classification Search .................. 707/732
See application file for complete search history.

(56) References Cited

U.S. PATENT DOCUMENTS

| | | | |
|---|---|---|---|
| 7,526,472 B2* | 4/2009 | Heidloff et al. ................. 1/1 |
| 2005/0171955 A1* | 8/2005 | Hull et al. ................. 707/10 |
| 2006/0106788 A1 | 5/2006 | Forrest | |
| 2006/0143160 A1 | 6/2006 | Vayssiere | |
| 2006/0218153 A1* | 9/2006 | Voon et al. ................. 707/10 |
| 2006/0242130 A1* | 10/2006 | Sadri et al. ................. 707/3 |
| 2007/0124371 A1* | 5/2007 | Desai et al. ................. 709/204 |
| 2007/0255931 A1 | 11/2007 | Kobayashi et al. | |
| 2008/0046532 A1* | 2/2008 | Caspi et al. ................. 709/207 |
| 2008/0208973 A1 | 8/2008 | Hayashi et al. | |

FOREIGN PATENT DOCUMENTS

| KR | 102007003172 | 3/2007 |
|---|---|---|
| WO | 2007052285 A2 | 5/2007 |

OTHER PUBLICATIONS

Official Communication for Korean Patent Application No. 10-2010-7020233 mailed Oct. 21, 2011.
International Search Report and Written Opinion for International Patent Application No. PCT/US2009/031107 mailed Jul. 31, 2009.
International Preliminary Report on Patentability for International Patent Application No. PCT/US2009/031107 mailed Aug. 26, 2010.

* cited by examiner

Primary Examiner — Charles Lu
(74) Attorney, Agent, or Firm — Frommer Lawrence & Haug LLP; Jamie L. Wiegand (57) ABSTRACT A device, system and method to enable communications over a network wherein a user may conduct a search directed to target contacts within a social network. A knowledge base of prior social search responses may be searched for responses from the target contacts with the results being presented to the user. The results of the search can be sorted along with responses received from the target contacts. The selection of target contacts and presentation of results can be based on various attributes of target contacts or ranking of the prior search responses. The search responses received by the user along with attributes and rankings may be stored in the knowledge base for future use. The target contacts and search may be taken from contacts or the knowledge base of the contacts with greater than one degree of separation from the user.

18 Claims, 7 Drawing Sheets

SOCIAL NETWORK SEARCH

TECHNICAL FIELD

The present invention relates generally to searching for information within a social network. More particularly, the invention integrates social search request responses with a knowledge base of prior social search responses to provide more timely and relevant answers to social search requests.

BACKGROUND

Tremendous changes have been occurring in the Internet that influence our everyday lives. For example, online social networks have become the new meeting grounds. The development of such online social networks touch countless aspects of our everyday lives, providing instant access to people of similar mindsets, and enabling us to form partnerships with more people in more ways than ever before.

One of the more useful features of the internet and associated forms of communication such as e-mail, instant messaging, chat rooms and forums is the access to information that is useful in everyday work and social lives. There exists a substantial amount of information within the internet. However, the information obtained by searching the internet is often generic and does not account for the searcher's level of education, location, socioeconomic status or the like. The response to a search of the internet is typically presented to the user by relevancy to the search request and/or other similar criteria which are based the wording of the search request. More often than not, the user is required to review a large amount of information that is not in feet relevant to the user's request. For instance, the user's background or knowledge in the subject matter may not match that of many of the search request results. Some information may be too detailed or technical while other information may be too generic. Likewise, if a user submits a query to a message board, blog, forum or similar on-line interactive site, many of the responses to the user's request will be from people who come from different backgrounds with different tastes and varying levels of knowledge in particular areas. This is particularly true for queries that are social in nature, wherein the responses to the request are more opinion than fact. Although some responses could be highly relevant, a large number of the responses can have low usefulness or relevance to the user's request. A user could also submit inquiries to their friends and family through e-mail, instant messaging or similar methods of communication. However, the responses may be sporadic, have no organization and may be repetitive of other requests made within the social network. Therefore, it is with respect to these considerations and others that the present invention has been made.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION

The present invention now will be described more fully hereinafter with reference to the accompanying drawings, which form a part hereof, and which show, by way of illustration, specific embodiments of the invention. However, this invention may be embodied in many different forms and should not be construed as limited to the embodiments set forth herein. Rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. Therefore, the following detailed description is not to be taken in a limiting sense.

Throughout the specification and claims, the following terms take the meanings explicitly associated herein, unless the context clearly dictates otherwise. The phrase "in one embodiment" does not necessarily refer to the same embodiment, although it may. Furthermore, the phrase "in another embodiment" does not necessarily refer to a different embodiment, although it may. Thus, as described below, various embodiments of the invention may be readily combined without departing from the scope or spirit of the invention.

A "social search" or "social inquiry" is a search or inquiry for any type of information from a person's social network. Such a search is generally opinion-based such that a person's background and experience may, to varying degrees, shape the response. Non-limiting examples of social searches or inquiries are: the best restaurants in a particular location; experiences with consumer products; and the likes or dislikes in the work of recording artists.

As used herein, the term "social network" refers to an individual's network of friends, family, colleagues, coworkers, and potentially the subsequent connections within those networks. A social network, for example, can be utilized to find more relevant connections for a variety of activities, including, but not limited to dating, job networking, service referrals, content sharing, like-minded individuals, activity partners, or the like.

An online social network refers to a person's set of direct and/or indirect personal relationships, including real and virtual privileges and permissions that users may associate with these people. Direct personal relationships refers to relationships with people the user communicates with directly, including family members, friends, colleagues, coworkers, and other people with which the person has had some form of direct contact, such as contact in person, by telephone, by email, by instant message, by letter, or the like. These direct personal relationships are sometimes referred to as first-degree relationships. First-degree relationships can have varying degrees of closeness, trust, and other characteristics.

Indirect personal relationships refer to relationships through first-degree relationships to people with whom a person has not had some form of direct or limited direct contact, such as in being cc'd on an email message, or the like. For example, a friend of a friend represents an indirect personal relationship. A more extended, indirect relationship might be a friend of a friend of a friend. These indirect relationships are sometimes characterized by a degree of separation between the people. For instance, a friend of a friend can be characterized as two degrees of separation or a second-degree relationship. Similarly, a friend of a friend of a friend can be characterized as three degrees of separation or a third-degree relationship, and so forth.

Although not necessarily true, a social network generally consists of individuals with similar experiences, opinions, education levels and/or background. For social searches or inquiries, a person's first-degree social network can be a great source of information. The reason is that the direct relationship with the individuals is likely to lead to more relevant information, more forthcoming and complete responses and responses from individuals with similar experience, opinions, education levels, background, and so on.

A social search or inquiry can obtain more meaningful results if directed to target contacts within a social network. "Target contacts" are those individuals within a social network that receive the social search or inquiry. The target contacts may be determined by the system in various ways. In one embodiment, the individuals may be selected by the user. Alternatively, the individuals may be automatically selected based on particular attributes that are relevant to the social search. For example, a target contact may be a person who has the "attribute" of having particular expertise in an area of interest. For instance, a person within an individual's social network may have opinions in certain areas that are of more interest than other persons within the social network. As an example, a particular target contact may be extremely knowledgeable about restaurants in a particular location within a city. Such a target contact could be provided with the attribute "Food Lover." Thus, any restaurant-related social search or inquiry responses about restaurants from such an individual would be particularly relevant and might be given a higher relevancy rating. The attribute may be used as a factor in the automatic selection by the system of target contacts. The attribute may also be used in presentation of search results. As another example, an attribute may be provided to a person whose opinion is highly valued, has provided previous valuable responses or has some special relationship to the user. Alternatively, an attribute may also have a negative weighting, such as a person who is within the social network but whose opinion on certain topics is of low value because of, for example, a lack of experience or dissimilar tastes to the user.

The information obtained by social searches can be captured and retained by the user in a knowledge base. A knowledge base, in the general sense, is a collection of results from social searches. The knowledge base can be individual to a particular user such that only social searches by the particular user are retained within the knowledge base. Alternatively, the knowledge base can include social searches of a social network. In such an instance, the knowledge base would associate particular responses with particular persons within the social network. The knowledge base may include information about attributes of persons within the social network, and may also include information about the usefulness of the social search response. The information about usefulness could be a rating system, such that a highly relevant and useful response would be given a high rating (for example, three stars) and an irrelevant response would be given a low rating (such as no stars). Such ratings could then be used to provide rankings for the information contained within the knowledge base with respect to particular social searches by particular users.

The number of responses to a social inquiry can be extended by obtaining responses from the extended social network. A person's second degree and third degree social networks can be a source for additional social search responses. However, as the degrees of separation increase, so does the differences between the user's background and experiences as compared to those of the extended social network and the potential for responses of lower relevance. This can be mitigated by directing the inquiry to target contacts with particular attributes. If the knowledge base is individual to particular users, then access to the extended social networks can be based on permissions provided by the owner of the social network knowledge base. The owner of the social network knowledge base can provide access permissions to those within a certain degree of separation from their social network. Alternatively, individuals within a social network can set permission contact levels so as to block social search requests from particular individuals or to groups of individuals such as inquiries from those beyond one's own first degree social network.

The following briefly describes the embodiments of the invention to provide a basic understanding of some aspects of the invention. This brief description is not intended as an extensive overview. It is not intended to identify key or critical elements, or to delineate or otherwise narrow the scope. Its purpose is merely to present some concepts in a simplified form as a prelude to the more detailed description that is presented later.

In conducting a social search, in one embodiment, a user will be presented with a social search interface on a client device such as a mobile phone, desktop computer, or similar client device. The interface will have an area for entering a social search and an interface for selecting target contacts to receive the social search. The user will enter the social search and target contacts to begin the social search process. In another embodiment, however, target contacts may be suggested to the user based on a variety of criteria, including, but not limited to a number of contacts available to the user, a type of search request, a subject of the social search request, or the like. For example, where the user is requesting a search based on food, the user could be provided with a target contact list that includes those contacts the user has identified as knowledgeable about food, thereby making the searching process easier and more convenient for the user.

In one embodiment, a network device receives the social search request, including target contacts, and forwards the social search request to the selected target contacts. The network device also performs a search of the user's knowledge base to find prior social search responses from the target contacts. The search results are extracted from the knowledge base, sorted according to relevance and presented to the user. Any responses received by the network device are then stored in the knowledge base to be used for subsequent social searches. The storing of the social search responses can be done automatically. Alternatively, the storing of the social search responses can be controlled by the user, such as by a prompt to the user as to whether to store the social search responses. As part of this process, ranking or categorization of responses can be made as part of the storing process. For instance, a social search response can be automatically categorized as relevant to a certain topic when stored in the knowledge base. Or, the user can be prompted to provide an attribute for the target contact that provided the social search response. The knowledge base could also contain information on the number of social search responses provided by particular target contacts and areas that the particular target contact provided responses for as part of the attribute for that particular target contact. The advantage of this is that the user can obtain instantaneous results from the search of the knowledge base, and then additional responses from the user's social network contacts at a later time.

In another embodiment of the invention, the network device could sort the extracted prior responses from the knowledge base together with the responses from the current target contacts. The sorted results would then be presented to the user together by relevancy or other criteria such as the attributes of the target contacts. For instance, if a search is performed for the best restaurants in midtown east, the knowledge base could be searched for target contacts that are within three degrees of separation from the user's social network and which contain the attribute "Food Lover." The results could be the sorted combined results of the current responses from the target contacts within the first (friends), second (friend of a friend) and third degree (friend of a friend of a friend) social networks and the knowledge base search results of prior social search requests for target contacts also within the first, second and third degree social networks. As apparent, the combined results of such a search will provide the collective knowledge of a relatively large group of people having particular expertise in a certain area, in this example food, who have a common link in the form of a social network. The search results can be provided after a predetermined event, such as, for example, a certain period of time has lapsed and/or after a predefined number of responses have been received by the target contacts, or the like. The search results can be provided in various ways, such as, for example, through a widget (an interface element that a computer user interacts with, such as a window or a text box).

In yet another embodiment, the user can be prompted to categorize or rank the responses received from the social inquiry or even the prior social search responses. By continually conducting social searches, categorizing, ranking and storing the results, one can increase their own knowledge base. By extending the target contacts beyond the first degree social network, a person can increase their knowledge base and is provided opportunities for further socialization. In effect, the knowledge base and rankings become an expert system that gradually increases the "knowledge" with each new social search request.

Illustrative Operating Environment

Figure 1:
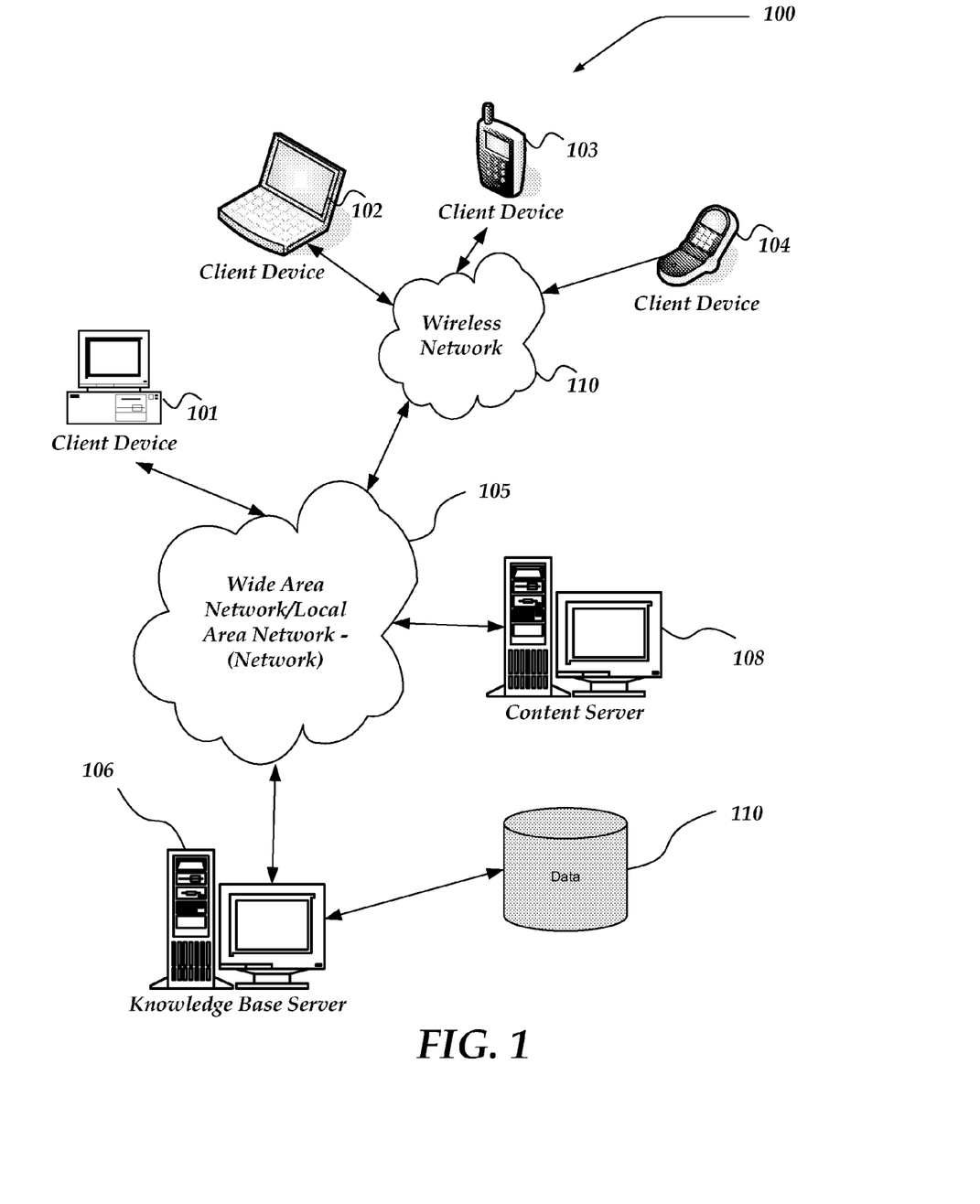
FIG. 1 is a system diagram of one embodiment of an environment in which the invention may be practiced.

FIG. 1 shows components of one embodiment of an environment in which the invention may be practiced. Not all the components may be required to practice the invention, and variations in the arrangement and type of the components may be made without departing from the spirit or scope of the invention. As shown, system 100 of FIG. 1 includes local area networks ("LANs")/wide area networks ("WANs")—(network) 105, wireless network 110, client devices 101-104, knowledge base server 106, and content server 108.

Generally, client devices 102-104 may include virtually any mobile computing device capable of receiving and sending a message over a network, such as wireless network 110, or the like. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, or the like.

One embodiment of a mobile device usable as one of client devices 102-104 is described in more detail below in conjunction with FIG. 2.

Client device 101 may include virtually any computing device that typically connects using a wired communications medium such as personal computers, multiprocessor systems, microprocessor-based or programmable consumer electronics, network PCs, or the like. In one embodiment, client devices 101-104 may be configured to operate over a wired and/or a wireless network.

Client devices 101-104 typically range widely in terms of capabilities and features. For example, a cell phone may have a numeric keypad and a few lines of monochrome LCD display on which only text may be displayed. In another example, a web-enabled client device may have a touch sensitive screen, a stylus, and several lines of color LCD display in which both text and graphics may be displayed.

A web-enabled client device may include a browser application that is configured to receive and to send web pages, web-based messages, or the like. The browser application may be configured to receive and display graphics, text, multimedia, or the like, employing virtually any web based language, including a wireless application protocol messages (WAP), or the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), or the like, to display and send a message.

Client devices 101-104 also may include at least one other client application that is configured to receive content from another computing device. The client application may include a capability to provide and receive textual content, multimedia information, or the like. The client application may further provide information that identifies itself, including a type, capability, name, or the like. In one embodiment, client devices 101-104 may uniquely identify themselves through any of a variety of mechanisms, including a phone number, Mobile Identification Number (MIN), an electronic serial number (ESN), network address, or other device identifier. The information may also indicate a content format that the client device is enabled to employ. Such information may be provided in a message, or the like, sent to another computing device.

Client devices 101-104 may also be configured to communicate a message, such as through email, Short Message Service (SMS), Multimedia Message Service (MMS), instant messaging (IM), internet relay chat (IRC), Mardam-Bey's IRC (mIRC), Jabber, or the like, between another computing device. However, the present invention is not limited to these message protocols, and virtually any other message protocol may be employed.

Client devices 101-104 may further be configured to include a client application that enables the user to log into a user account that may be managed by another computing device, such as content server 108, knowledge base server 106, or the like. Such user account, for example, may be configured to enable the user to receive emails, send/receive IM messages, SMS messages, access selected web pages, participate in a social networking activity, provide messages that may include links or attachments, or the like. However, managing of messages may also be performed without logging into the user account.

A message may be sent using any of a variety of message protocols, including but not limited to SMS, IM, MMS, email, or the like. The recipient of message has the option of responding to the message either by addressing the response to only the sender, addressing the response to all of the recipients along with the sender or selecting particular recipients. The recipient can also forward the email onto others. For instance, the recipient may consider another person within their own social network as having particular expertise in the area so that they will forward the received message to the person in their network for response. In such an instance, the forwarded recipient may then be given the option of responding directly back to the original sender or to the recipient that receives the message. Moreover, in one embodiment, the forwarded message may include a reference to the content, article, or message using, for example, an attachment, a link, a copy of the content, article, or message within the forwarded message, or virtually any other mechanism.

A user's social network can consist of many different groups. For instance, an initial social network can be any contact within the person's email address book. A person's social network can also include various groups, for instance the individual's contacts can be grouped into work-related contacts, school-related contacts, social contacts and the like. The addresses for these social contacts can be saved within memory in client devices 101-104 or can reside elsewhere within wide area network/local area network 105 or wireless network 110 or on various servers connected to these networks.

In one embodiment, a recipient of a social search may have their own social network contacts that are also accessible by the network. The recipient may have predetermined permission levels for access by individuals within their social network to the recipient's social network contacts. If the permission level is granted, the social search by the user can be forwarded to each of the social contacts within the recipient's social network. If this is done, the responses to the user's social search will become more meaningful because they will include responses from like-minded individuals, e.g., from individuals with similar education levels, age, socio-economic status or the like. In one embodiment, the responses from the recipient's social network may be added to the user's knowledge base.

The contacts within a user's social network can be categorized with different attributes. Particular contacts can be considered to have expertise in particular areas. For instance, one particular contact can be considered as an expert in new consumer technologies. Another contact can be particularly knowledgeable about music. Contacts can also have attributes such as someone who has similar tastes to the user, or similar styles to the user or the like. The social network contacts can also have attributes that can be considered as negative attributes, such as having dissimilar tastes or lacking knowledge in particular areas. Thus, one embodiment takes advantage of the particular areas of expertise of one's social network. By providing these attributes to the contacts within a user's social network, the user can obtain more relevant information in a more timely manner by the ranking and categorizing of responses to a social request according to these different attributes.

In one embodiment of the invention, a social request is made by the user to the social network contacts. The target contacts may respond to the social request. The system will search prior social requests and then categorize prior social requests along with the responses by the target contacts according to the attributes of the target contacts. For instance, only those responses and prior responses by target contacts with the attribute of having particular expertise or similar taste or style will be presented to the user. Alternatively, those target contacts with an attribute of expertise would be given higher weighting for relevancy than other target contact responses.

In another embodiment of the invention, the recipients of the social search request who have provided permissions for access to their own social network contacts would have the social search request automatically forwarded to target contacts within the recipient's social network having relevant attributes to the social search request or attributes designated by the user's social search request. In such an embodiment, the attributes provided by the users would necessarily be the same or comparable. For such an embodiment, the potential attributes would be standardized among the users of the social search system. However, the potential attributes can also be customized by the user, and potentially shared within the user's social network.

When the user receives responses to the social request, they are given an opportunity to either categorize/rank the response in some manner or categorize/rank the target contact with particular attributes, and then store or update the social search request responses in a knowledge database. It is the storing of these prior social search responses which creates a knowledge base for the particular user. It is these attributes of the target contacts and relevancy of the social search responses that permit more relevant responses to future social search requests, in one embodiment.

Wireless network 110 is configured to couple client devices 102-104 with network 105. Wireless network 110 may include any of a variety of wireless sub-networks that may further overlay stand-alone ad-hoc networks, or the like, to provide an infrastructure-oriented connection for client devices 102-104. Such sub-networks may include mesh networks, Wireless LAN (WLAN) networks, cellular networks, or the like.

Wireless network 110 may further include an autonomous system of terminals, gateways, routers, or the like connected by wireless radio links, or the like. These connectors may be configured to move freely and randomly and organize themselves arbitrarily, such that the topology of wireless network 110 may change rapidly.

Wireless network 110 may further employ a plurality of access technologies including 2nd (2G), 3rd (3G) generation radio access for cellular systems, WLAN, Wireless Router (WR) mesh, or the like. Access technologies such as 2G, 3G, and future access networks may enable wide area coverage for client devices, such as client devices 102-104 with various degrees of mobility. For example, wireless network 110 may enable a radio connection through a radio network access such as Global System for Mobile communication (GSM), General Packet Radio Services (GPRS), Enhanced Data GSM Environment (EDGE), Wideband Code Division Multiple Access (WCDMA), Bluetooth, or the like. In essence, wireless network 110 may include virtually any wireless communication mechanism by which information may travel between client devices 102-104 and another computing device, network, or the like.

Network 105 is configured to couple knowledge base server 106 and its components with other computing devices, including, content server 108, client device 101, and through wireless network 110 to client devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In essence, network 105 includes any communication method by which information may travel between computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" includes a signal that has one or more of its characteristics set or changed in such a manner as to encode information, instructions, data, or the like, in the signal. By way of example, communication media includes wired media such as twisted pair, coaxial cable, fiber optics, wave guides, and other wired media and wireless media such as acoustic, RF, infrared, and other wireless media.

One embodiment of knowledge base server 106 is described in more detail below in conjunction with FIG. 3. Briefly, however, knowledge base server 106 may include any computing device capable of connecting to network 105 to enable managing of communication within a social network. In one embodiment, knowledge base server 106 may provide an interface to a user of client devices 101-104 that may be used to post, spread, delete, or otherwise manage distribution of messages and communication.

Knowledge base server 106 can store responses to a user's social search requests within data storage 110. The data storage 110 can have multiple knowledge bases. In one example, the knowledge base can include knowledge bases for each particular user. In another example, the knowledge base can be an aggregated knowledge base for multiple users. In the latter example, the access to individual responses can be determined based on the identity of the user. The knowledge base may include the target contact identifying information, content of the response, and any rankings/categorization of the target contact or response. The knowledge base may also be a distributed platform accessible in different methods, such as HTTP or TCP proxy interfaces. The knowledge base may be duplicated in different locations, and may be indexed or archived for reference.

It should be noted that while FIG. 1 illustrates a use of knowledge base server 106 to manage messages and communication, the invention is not so limited. For example, as noted above, client devices 101-104 may also be configured with a client application, script, plug-in, widget, applet, or the like, that is configured and arranged to enable the client device to manage communications within a social network. Moreover, in another embodiment, various functions performed by knowledge base server 106 may be distributed across a plurality of network devices or client devices.

Devices that may operate as knowledge base server 106 may include personal computers, desktop computers, multiprocessor systems, microprocessor-based or programmable consumer electronics, network PCs, servers, or the like.

Content server 108 includes virtually any network computing device that is configured to provide various resources, including content and/or services over network 105. As such, content server 108 represents one embodiment of a content system. Content server 108 may provide access to any of a variety of content, including, but not limited to messages, such as emails, SMS messages, IM messages; search results; news; articles; websites; hyperlinks; ads; reviews; as well as content that may include audio files, video files, text files, streaming files, graphical files, or the like. Thus, virtually any content may be available through content server 108 for access by client devices 101-104. In one embodiment, content server 108 might be configured and arranged to provide a website for users to post, view, link to, and/or otherwise access, content. Content server 108 might also provide FTP services, APIs, web services, database services, or the like, to enable users to access content. In addition, content server 108 may also provide a messaging service, such as an email server, text messaging server, or the like. However, content server 108 is not limited to these mechanisms, and/or content, and others are envisaged as well.

Content server 108 may include an interface that may request information from a user of client devices 101-104. For example, content server 108 may provide access to an account, which may request user log-in information. Such log-in information may include a user name, password, or other identifier of the user and/or client device used by the user. Moreover, content server 108 may also be configured to manage information for a user, such as an address book, buddy list, or other type of contact list. Such contact lists may be made available to knowledge base server 106, in one embodiment.

Devices that may operate as content server 108 include, but are not limited to personal computers, desktop computers, multiprocessor systems, microprocessor-based or programmable consumer electronics, network PCs, servers, network appliances, and the like. Moreover, while knowledge base server 106 and content server 108 are illustrated as distinct devices, the invention is not so limited. For example, in one embodiment, knowledge base server 106 and content server 108 may be implemented within a single network device, or distributed across a plurality of network devices.

Illustrative Client Environment

Figure 2:
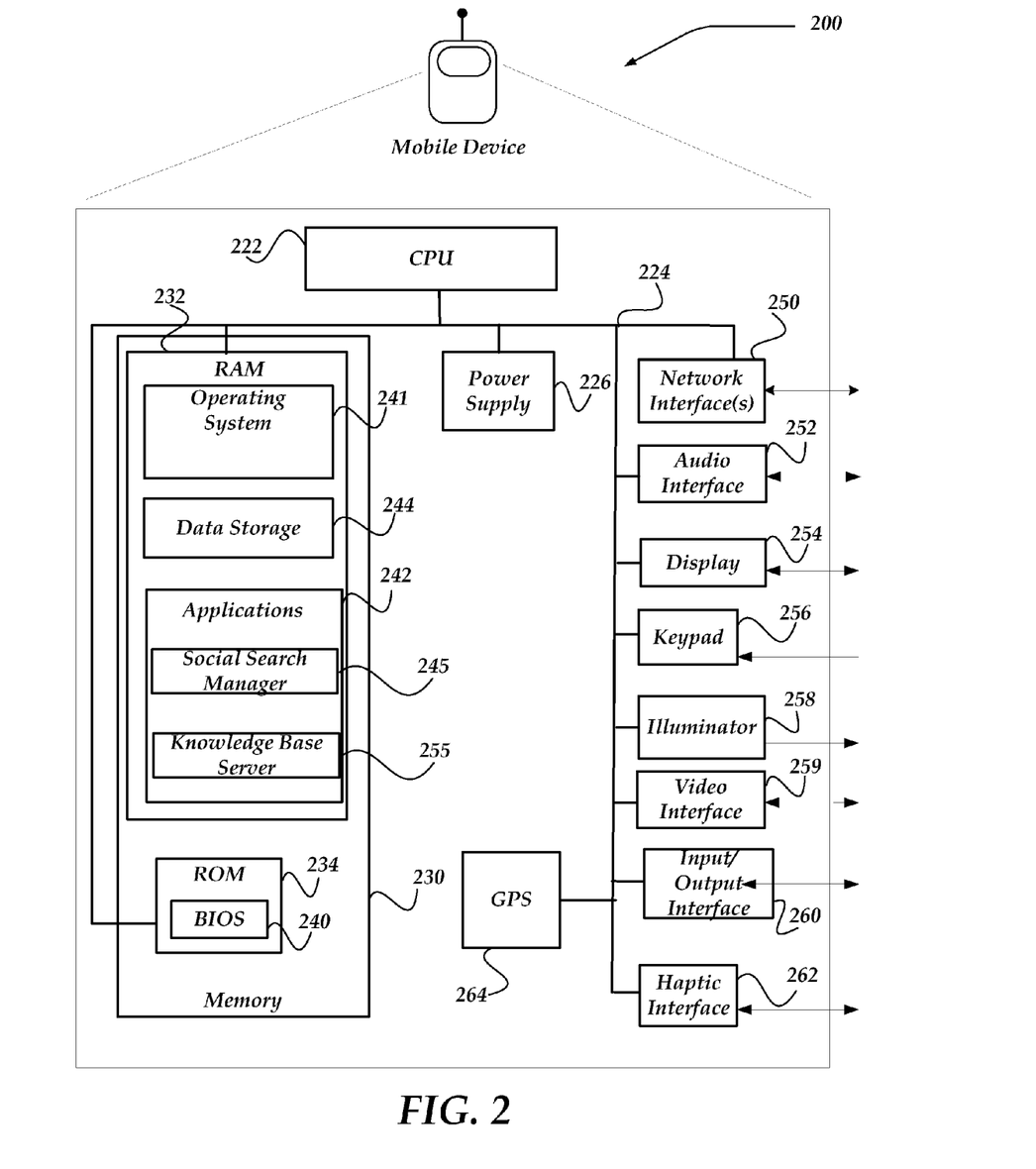
FIG. 2 shows one embodiment of a mobile device that may be included in a system implementing the invention.

FIG. 2 shows one embodiment of mobile device 200 that may be included in a system implementing the invention. Mobile device 200 may include many more or less components than those shown in FIG. 2. However, the components shown are sufficient to disclose an illustrative embodiment for practicing the present invention. Mobile device 200 may represent, for example, one of client devices 102-104 of FIG. 1.

As shown in the figure, mobile device 200 includes a processing unit (CPU) 222 in communication with a mass memory 230 via a bus 224. Mobile device 200 also includes a power supply 226, one or more network interfaces 250, an audio interface 252, video interface 259, a display 254, a keypad 256, an illuminator 258, an input/output interface 260, a haptic interface 262, and an optional global positioning systems (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Mobile device 200 may optionally communicate with a base station (not shown), or directly with another computing device. Network interface 250 includes circuitry for coupling mobile device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, Bluetooth™, infrared, Wi-Fi, Zigbee, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Mobile device 200 also comprises input/output interface 260 for communicating with external devices, such as a headset, or other input or output devices not shown in FIG. 2. Input/output interface 260 can utilize one or more communication technologies, such as USB, infrared, Bluetooth™, Wi-Fi, Zigbee, or the like. Haptic interface 262 is arranged to provide tactile feedback to a user of the client device. For example, the haptic interface may be employed to vibrate mobile device 200 in a particular way when another user of a computing device is calling.

Optional GPS transceiver 264 can determine the physical coordinates of mobile device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of mobile device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, a client device may through other components, provide other information that may be employed to determine a physical location of the device, including for example, a MAC address, IP address, or the like.

In one aspect of the invention, the physical location of the mobile device can be used as an aspect of the social search recipient for conducting the sorting of responses. For instance, the social search can be directed to only those social contacts within a certain distance from a particular location.

Mass memory 230 includes a RAM 232, a ROM 234, and other storage means. Mass memory 230 illustrates another example of computer readable storage media for storage of information such as computer readable instructions, data structures, program modules, or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, the Symbian® operating system, or Y! GO. The operating system may include, or interface with a Java virtual machine module that enables control of hardware components and/or operating system operations via Java application programs.

Memory 230 further includes one or more data storage 244, which can be utilized by mobile device 200 to store, among other things, applications 242 and/or other data. Memory 230 can also be used to store the user's knowledge base. For example, data storage 244 may also be employed to store information that describes various capabilities of mobile device 200. The information may then be provided to another device based on any of a variety of events, including being sent as part of a header during a communication, sent upon request, or the like. Moreover, data storage 244 may also be employed to store personal information including but not limited to address lists, contact lists, personal preferences, or the like. Data storage 244 may also include some profile information. At least a portion of the information may also be stored on a disk drive or other storage medium (not shown) within mobile device 200.

Applications 242 may include computer executable instructions which, when executed by mobile device 200, transmit, receive, and/or otherwise process messages (e.g., SMS, MMS, IM, email, and/or other messages), multimedia information, and enable telecommunication with another user of another client device. Other examples of application programs include calendars, browsers, email clients. IM applications, SMS applications, VOIP applications, contact managers, task managers, transcoders, database programs, word processing programs, security applications, spreadsheet programs, games, search programs, and so forth. Applications 242 may also include Social Search Manager (SSM) 245 and Knowledge Base Server 255. Knowledge Base Server 255 may be any application program for managing the knowledge base of prior social search responses, as described further below. In one embodiment, Social Search Manager 245 may be a browser application. In another embodiment, Social Search Manager 245 may be a browser application with a downloadable plug-in, script, applet, widget, or the like, that is configured and arranged to manage communications between the user and the user's social network.

SSM 245 may include a browser application configured to receive and display graphics, text, multimedia, and the like, employing virtually any web based language. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), eXtensible Markup Language (XML), and the like, to display and send a message. However, any of a variety of other web based languages may be employed.

SSM 245 may further be configured as a messenger application that is configured to send, to receive, and/or to otherwise process messages using SMS, MMS, IM, email, VOIP, and/or any of a variety of other messaging communication protocols. Although a single SSM 245 is illustrated it should be clear that multiple applications may be employed, for example, one SSM 245 may be configured to manage SMS messages, where another application may manage IM messages, and yet another messaging client is configured to manage emails, or the like. One embodiment of an interface useable on mobile device 200 for managing social search communications is described in more detail below in conjunction with FIG. 6.

Illustrative Network Device Environment

Figure 3:
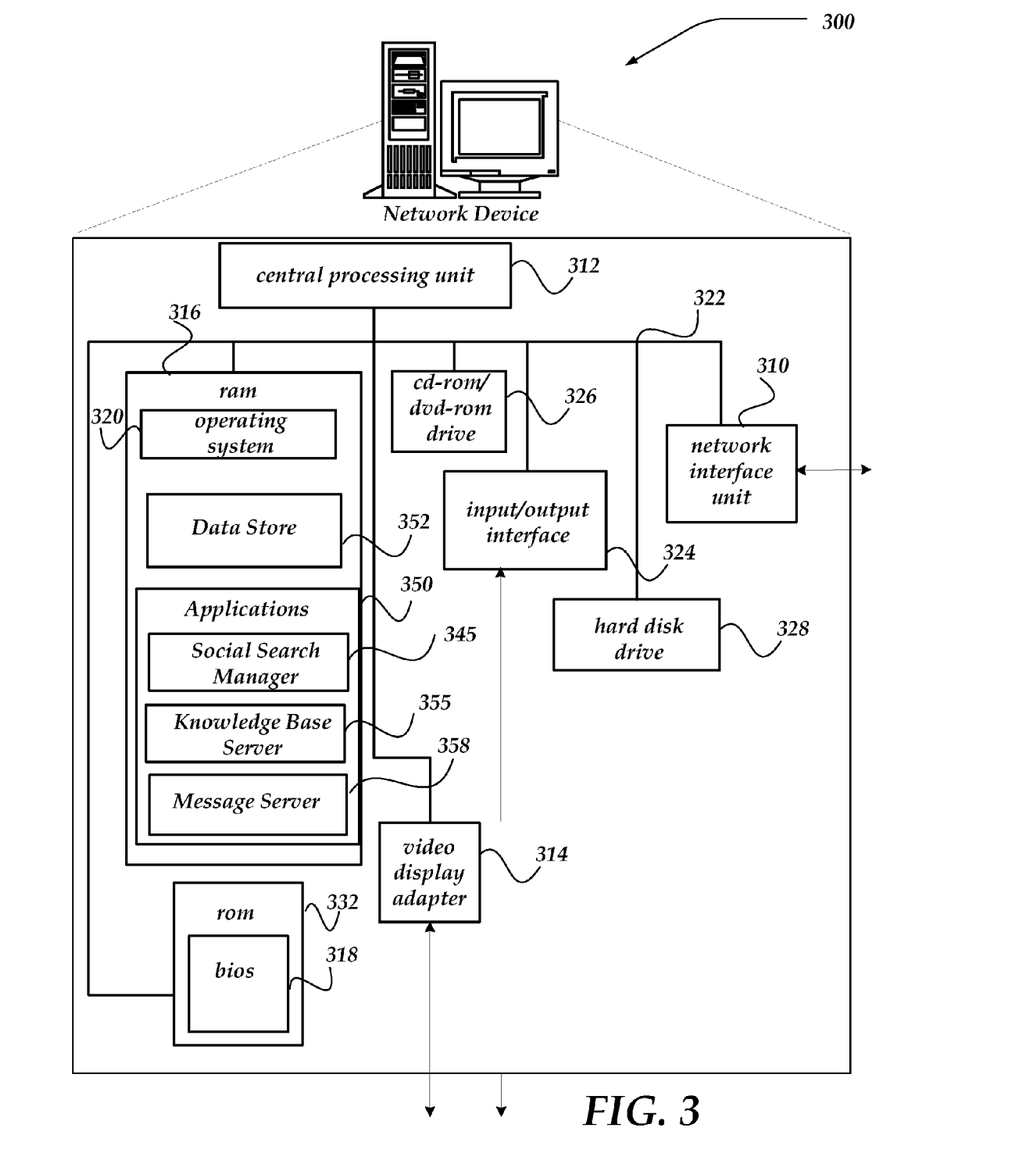
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, knowledge baser server 106 of FIG. 1.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer readable storage media. Computer readable storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs, customizable user interface programs, IPSec applications, encryption programs, security programs, VPN programs, web servers, account management, and so forth. Applications 350 may include Knowledge Base Server (KBS) 355, Social Search Manager 345 and message server 358. These applications can be based in the network device, in the mobile device, or in a distributed network. Thus, the invention may be implemented in a traditional client server arrangement, in a peer to peer network or any other architecture. Alternatively, the invention may be implemented as a software client run on currently existing platforms. A widget or messenger plug-in could implement the applications, wherein the applications are defined only within the application layer. The mass memory can also alternatively store the user's knowledge base within data storage 352, and/or cd-rom/dvd-rom drive 326, hard disk drive 328, or other computer readable storage medium (not shown).

Message server 358 may include virtually any computing component or components configured and arranged to forward messages from message user agents, and/or other message servers, or to deliver messages to a local message store, such as data store 352, or the like. Thus, message server 358 may include a message transfer manager to communicate a message employing any of a variety of email protocols, including, but not limited to Simple Mail Transfer Protocol (SMTP), Post Office Protocol (POP), Internet Message Access Protocol (IMAP), NNTP, or the like.

However, message server 358 is not constrained to email messages, and other messaging protocols may also be managed by one or more components of message server 358. Thus, message server 358 may also be configured to manage SMS messages, IM, MMS, IRC, mIRC, or any of a variety of other message types. Moreover message server 358 may also represent a web server configured to enable access to and/or management of messages.

In one embodiment, message server 358 may communicate with KBS 355 to enable a user to interface with the user's knowledge base of prior social search responses. In one embodiment, KBS 355 may provide a script, applet, application, or other downloadable component, to a client device for use in managing the content of the user's knowledge base. In another embodiment, KBS 355 may provide one or more web pages useable to manage the content of the user's knowledge base, and/or to perform social searches. In another embodiment, KBS 355 may provide information to message server 358, including an interface, or the like, for use in displaying, and/or otherwise managing messages, searches, or the like. Although not illustrated, in one embodiment, KBS 355 may be configured as a plug-in, or the like, to message server 358.

As messages are sent between client devices, KBS 355 might monitor for and/or receive notice of responses by users receiving social searches. KBS 355 may then use the response information, number of responses or timing of the responses manage providing results to the user of the user's social search.

Generalized Operation

Figure 4:
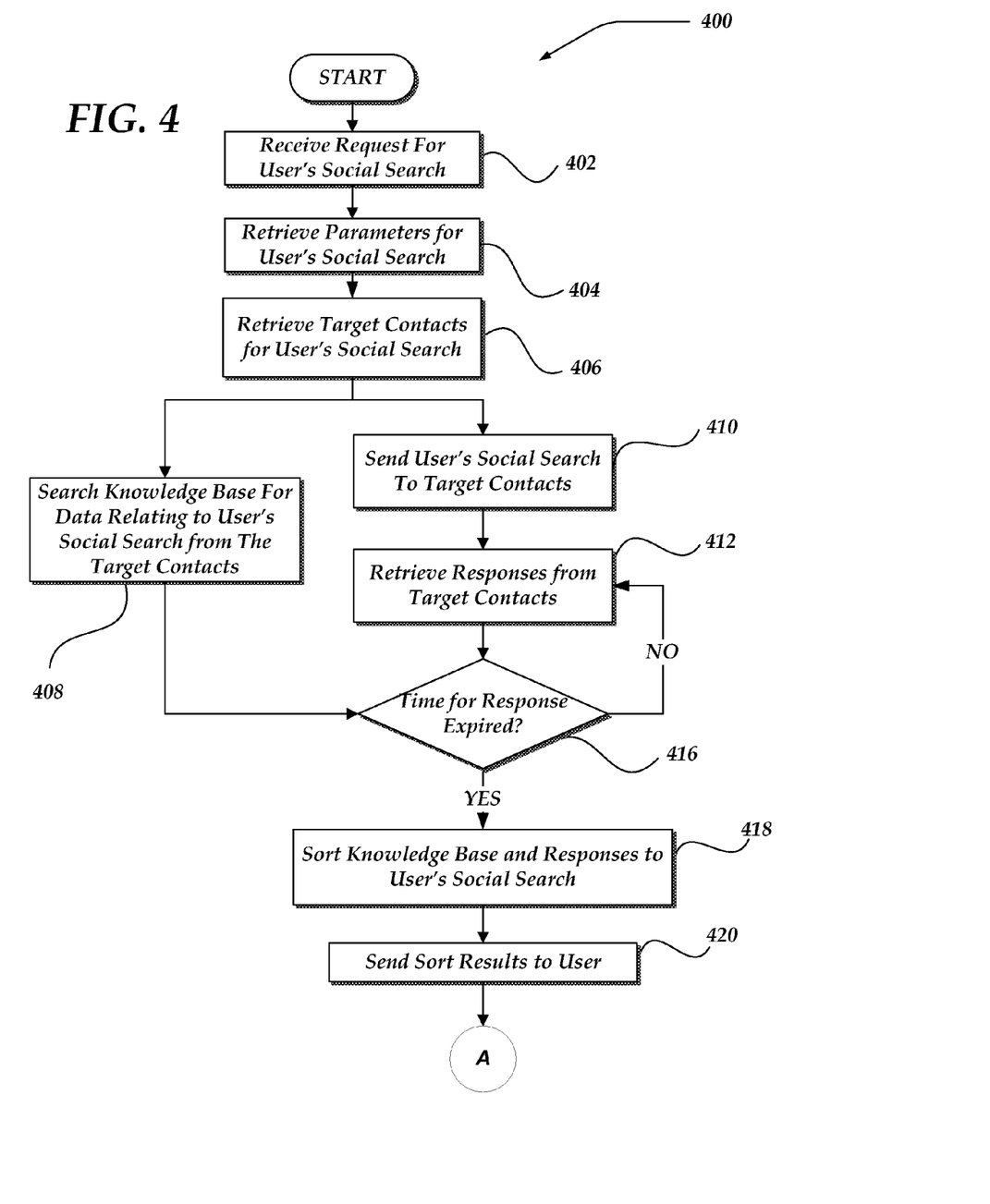
FIG. 4 illustrates a logical flow diagram generally showing one embodiment of a process for managing a social search request to target contacts within the user's social network.
Figure 5:
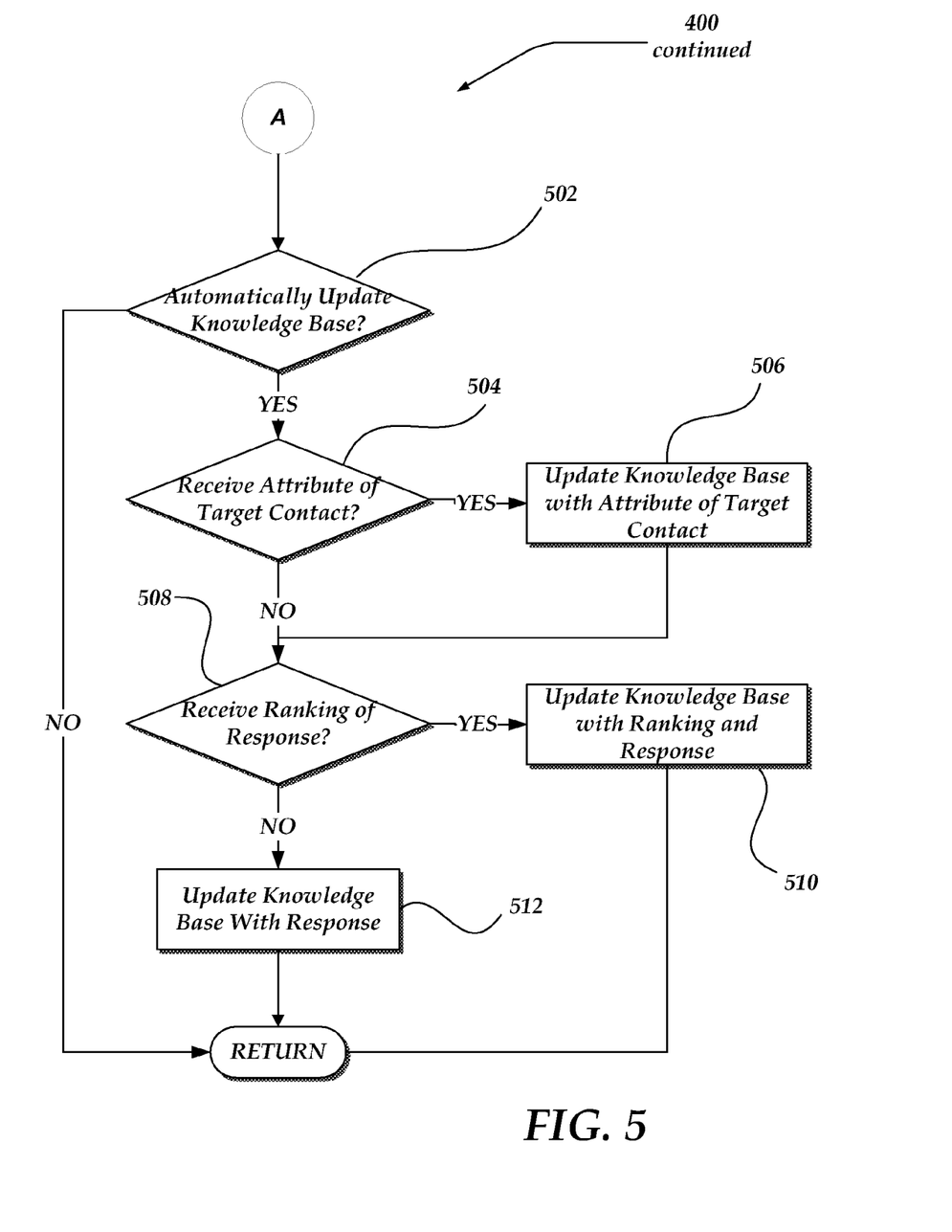
FIG. 5 illustrates the continued logical flow diagram of FIG. 4, including the updating of a knowledge base with the responses from the target contacts.

The operation of certain aspects of the invention will now be described with respect to FIGS. 4-5. FIGS. 4-5 illustrate a logical flow diagram generally showing one embodiment of a process for managing a social search request to target contacts within a user's social network. Process 400 of FIGS. 4-5 may be implemented, for example, within knowledge base server 106 of FIG. 1 or KBS 355 of FIG. 3.

Process 400 may begin, after a start block, at block 402, where a user generates a request for a social search to be sent to specific target contacts within at least the user's social network. The search request may be entered through an interface program as described below with respect to FIG. 6. As an example, a user may wish to ask his social network what the best restaurant for Italian food is in midtown east. As part of the request for a social search, in one embodiment, the user identifies target contacts. The target contacts may be all contacts within the user's address book, selected specific users within the address book, or defined groups of individuals or specific electronic addresses for target contacts entered by the user. The user's social search can have additional parameters, including but not limited to, such things as attributes of the target contacts or a categorization of the social search. For example, a search can be categorized in a certain area, with that area having a relation to various attributes of the target contacts. The user can have predefined categories of social searches such as those relating to electronics, food, entertainment, or the like. The user can enter a particular social search and identify a particular categorization for the social search such as food-related. The system would then use the related topic to identify the target contacts from the user's address book. In such an instance, the user would have predefined his address book contacts by various rankings or categorizations. In another example, the user could characterize all of the contacts within his address book by particular areas of expertise, and then a drop down list of those expertise areas can be provided to the user when entering the social search.

The process then flows to blocks 404 and 406 where the parameters of the user's social search are used to set up a database search. The parameters of the user's social search can be such things as a text question entered in by the user wherein search terms would be parsed from the search request and used for the database search. The social search request can also be a form wherein there may be topics, subtopics and sub-subtopics. The social search request may also be in some type of multimedia form. At block 406, the target contacts for the social search are determined or retrieved. The target contacts may be a specific list of target contacts generated by the user, may be automatically generated or may be a combination thereof. As an example, a user's address book may be used as target contacts. Alternatively, target contacts may be determined based on attributes of the contacts, or attributes of the contacts in relation to the text of the social search. The target contacts may also be the user's target contacts, and contacts associated with the target contacts. Thus, the target contacts may include first, second, third or higher degree of contacts from the user. For example, the address books of the user's target contacts may be used to generate additional target contacts. The second, third or more target contacts can be generated initially, or may be generated at a later time. In one embodiment, only the user's first degree contacts may be used as target contacts. After the first degree target contacts are queried with the social search request, second degree or more target contacts can then be automatically generated and queried with the same social search request. This may be done using a centralized processing system or a distributed network.

At block 408, the user's social search retrieved in block 404 and the user's target contacts retrieved at block 406 are used to search a knowledge base for prior social search responses that relate to the user's social search based on the search criteria and the target contacts. The search would find prior responses by the target contacts and then further search for the prior responses that relate to the social search. This searching can be done in any manner known to those of ordinary skill in the art. The searching can also be conducted on the knowledge bases of target contacts, and the knowledge bases of the contacts of the target contacts.

At about the same time that the social search is conducted through the knowledge base, the system may query the target contacts by sending the user's social search to the target contacts directly at block 410. The method of transmission can be through email, instant messaging or any other form of electronic communication as described previously. In one embodiment, before the results of the search of the knowledge base of prior social search responses in block 408 and responses by the target contacts in 410 are provided to the user, the system would wait for a predetermined time for the target contacts to respond to the request. This is shown in blocks 412 and 416 wherein the system waits for a predetermined period of time before continuing with the process. In another embodiment, some other event, condition, criteria, or the like, may be used to determine when to continue to block 418, including, but not limited to, a percentage of responses being received, a response being received from at least one target contact, or the like. Alternatively, the results of the search of the knowledge base for prior social search responses can be given directly to the user and then subsequently the responses to the social search by the target contacts can be provided by the system.

When decision block 416 is satisfied, the process continues to block 418 where the responses and/or prior responses are sorted in accordance with relevancy characteristics. A relevancy characteristic may be a single parameter such as an attribute, degree of separation, relationship to the user, prior ranking of prior responses, prior ranking of the target contact, or a combination of any number of the foregoing. A relevancy characteristic may also be the degree of correlation between the social search and responses to the social search. As an example, a correlation between the keywords of the search and responses may be used to determine the relevancy of the response to the social search. The invention is not limited to these, and other characteristics may also be used. As an example, responses provided by target contacts that have specialized knowledge in a particular area can be given greater weight than responses from target contacts that do not have such expertise, even though the latter responses have a higher degree of correlation with the social search. The expertise can be provided by the user as data stored, for example, in their address book. As another example, the sorting of the prior responses from the knowledge database can be weighted by a ranking, characterization or grading of the prior responses by the user. For instance, if the user found a number of prior responses to be particularly interesting or relevant, they can provide a high grading to such responses. A system could be used such as one star, two star or three stars where one star is a good response and three stars is a great response. In another embodiment, the grading of responses can be used to provide a higher weighting to responses from particular target contacts. For instance, if a particular target contact had made a number of highly relevant responses and received three stars for such responses, that target contact can be given a greater weight in future responses. The ratings or rankings can be made manually by the user or can be automated based on actions or responses by the user or the target contacts.

After the responses and prior responses are sorted, the sorted results can be sent to the user at block 420. The responses can be shown to the user in a number of different manners, one example being shown in FIG. 6. As apparent, the steps can be performed in various manners. In one embodiment, both the prior responses and current responses are provided to the user at the same time. In another embodiment, the prior responses are provided first, and the current responses are provided at a later time. In that embodiment, the prior responses provided an initial response and need to wait for the response from the target contacts.

After the user receives the responses, the user can be provided with an option of updating the knowledge base with the new social search responses that were received from the target contacts. This is shown in FIG. 5 in block 502 which is a continuation of process 400 of FIG. 4. The user can set the system so that the knowledge base is automatically updated or the user may be prompted to update the knowledge base with the responses. For a social search response, the user can be prompted to provide an attribute of the target contact as a result of the social search response, as shown in block 504. The user can enter in an attribute of the target contact, which can be entered by either a drop down list or the typing of a particular category or the attribute of the target contact, or by any of a variety of other ways, if the attribute is entered, that attribute is then added to the knowledge base of the target contact as shown in block 506. Alternatively, all the entries can be made and then the information updated to the knowledge base after entry of all the information. The user can also be prompted to provide a ranking of the response, such as the one, two, or three star system. The receipt by the network device of the ranking is shown in block 508. If a ranking is received, the knowledge base can be updated with the ranking and the response as shown in block 510.

The updating of the knowledge base with attributes, rankings and social search responses creates the knowledge base. At the start, the knowledge base may be empty. In one embodiment, however, the knowledge base may be initially populated based on a variety of information obtained about the user, such as from other searches the user may have performed, browsing history data about the user, or the like. As social searches are conducted, the knowledge base will grow. The knowledge base can be expanded at a faster rate by including social search request responses from first, second, third or higher degree contacts. These social search responses from First and second and third degree contacts can be managed by attributes and ranking to provide responses that would be highly relevant to the user because they can be based upon various degrees of expertise or similarities that exist between the contacts within the user's social network.

It will be understood that each block of the flowchart illustration, and combinations of blocks in the flowchart illustration, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer implemented process such that the instructions, which execute on the processor to provide steps for implementing the actions specified in the flowchart block or blocks. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

Illustrated Examples & User Interface

Other aspects of the invention will now be described with respect to FIG. 6 which shows an example of a user interface on a mobile client device. It should be noted, however, that the invention is not limited by this example embodiment, and others may be used.

Figure 6:
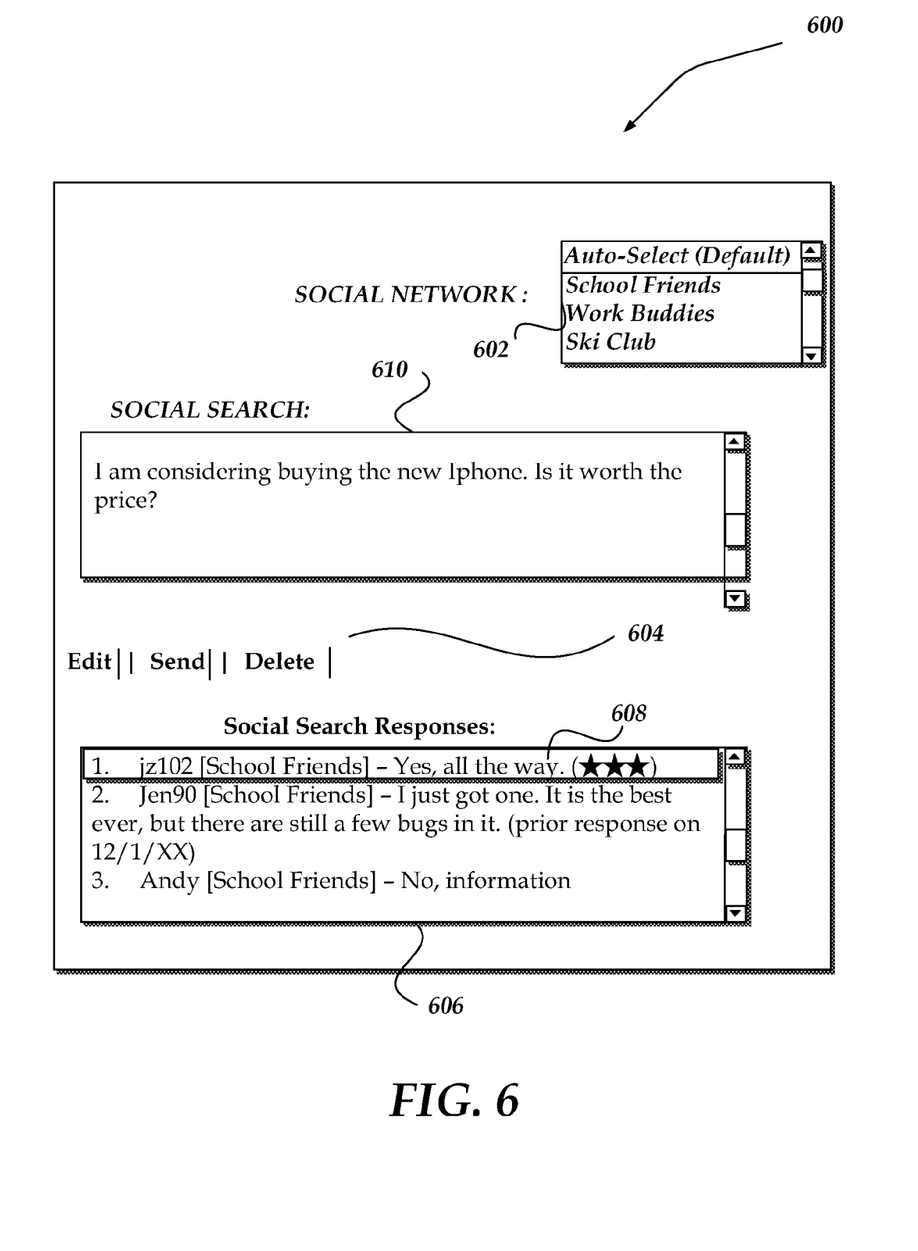
FIG. 6 illustrates an example interface usable for managing a social search request.

FIG. 6 shows interface 600 for conducting a social search. Target contact selection interface 602 provides a drop down menu for the selections of target contacts. In this example, the user can select from target contact groups such as school friends, work buddies, and ski club. Alternatively, the user can select "Auto-Select" in which the system would automatically determine the appropriate target contacts, for instance from the user's address book. For another alternative, the user can individually select the target contacts.

The user enters a social search through social search interface 610. The user may edit, send or delete the social search by selecting various options shown at 604. Interface 600 could also have social search response interface 606 which provides the results of the search results. Information regarding the social network identification, rankings of the target contact, whether the response is a current or prior response, ratings of the response and the like can also be alternatively provided within social search response interface 606.

Figure 7:
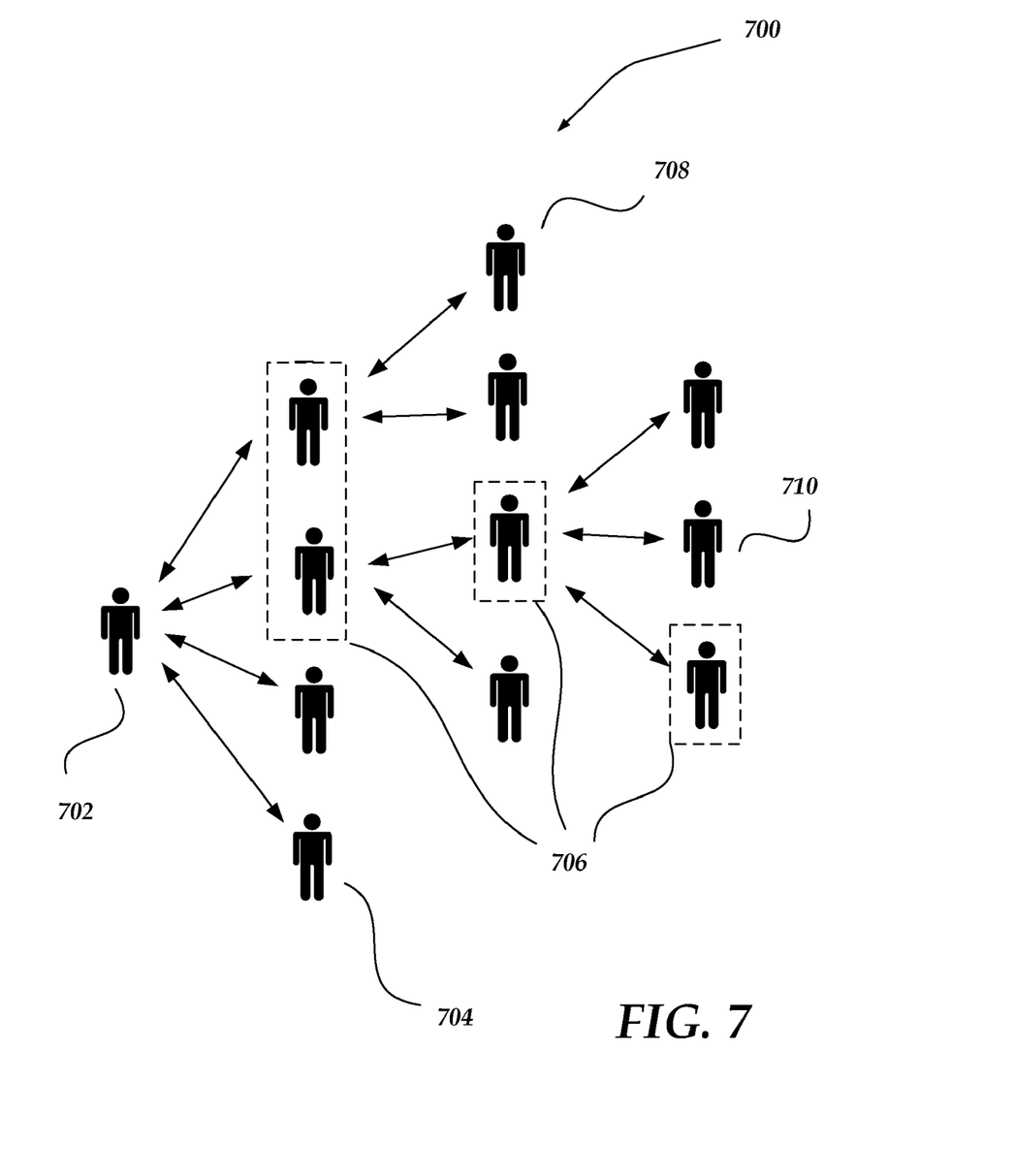
FIG. 7 illustrates one embodiment of a user's first, second and third degree social target contacts.

A graphical description of one embodiment, of a user's extended social network is shown in FIG. 7. Extended social network 700 of user 702 consists of first degree contacts 704. These are the immediate, personal contacts of user 702. These contacts may be contained in the user's electronic address book or the like. The second degree contacts 708 of user 702 are also the first degree contacts of first degree contacts 704. In other words, second degree contacts 708 are the friends of friends of user 702. Third degree contacts 710 are in turn friends of a friend of a friend. Each of the first degree contacts can be categorized by the user, for instance as an expert in a certain area as shown by the clotted box 706. The extended network can also be categorized in the same manner. Thus, a search among a user's extended social network limited to those with expertise as designated by dotted box 706 will return search results of social search responses by those individuals within clotted box 706. The search results can then be added to the knowledge base of user 702, either automatically or on prompting of the user. The user can provide various rankings or attributes of the responses and/or the target contacts. Alternatively, rankings and/or attributes can be automatically generated and assigned by the system. In this manner, a knowledge base is created and continually updated as more social searches are conducted by the user.

The above specification, examples, and data provide a complete description of the manufacture and use of the composition of the invention. Since many embodiments of the invention can be made without departing from the spirit and scope of the invention, the invention resides in the claims hereinafter appended.

What is claimed as new and desired to be protected is:

1. A network device to manage communications over a network, comprising:
  a transceiver to send and receive data over a network; and
  a processor that is operative to enable actions for:
  receiving a request for a social search for a user;

determining at least one target contact to query regarding the social search request;

querying the determined at least one target contact for a current social search response to the social search request;

determining at least one prior social search response that is relevant to the social search request and also relevant to a previously provided response associated with the determined at least one target contact based at least in part on an aggregated knowledge base of results for a plurality of social searches, wherein the aggregated knowledge base of results includes results from social searches of multiple users in a social network;

receiving at least one social search response that includes at least one of the at least one prior social search response or the current social search response that are associated with the determined at least one target contact;

sorting the at least one received social search response based on at least one relevancy characteristic, wherein each sorted social search response is provided in response to the social search request, and wherein the current social search response is provided to the user at a time later than the at least one prior social search response is provided to the user;

updating the aggregated knowledge base of results to include the at least one received social search response and at least a ranking or a categorization for at least one of the at least one received social search response, wherein each of the ranking or categorization is a ranking or categorization of a response;

determining at least one other prior social search response that is relevant to the social search request and associated with at least one other target contact referred to by the determined at least one target contact;

receiving the determined at least one other prior social search response associated with the at least one other target contact; and providing the sorted at least one received social search response to a user who requested the social search after an elapse of a predetermined period of time.

2. The network device of claim 1, further comprising:

providing the social search request to at least one other target contact referred to by the determined at least one target contact, wherein the at least one other target contact is enabled to provide another current social search response; and receiving the other current social search response associated with the at least one other target contact, wherein the received other current social search response is sorted by at least one relevancy characteristic and provided in response to the social search request.

3. The network device of claim 1, further comprising:

receiving from a recipient of the provided response, a relevancy characteristic for the current social search response; and storing the current social search response and associated relevancy characteristic.

4. The network device of claim 1, wherein the relevancy characteristic is a rating or ranking of the social search response.

5. The network device of claim 1, wherein the relevancy characteristic relates to an attribute of the target contact.

6. The network device of claim 2, wherein the at least one other target contact has one or more degrees of separation from the at least one target contact.

7. A method operating on one or more network devices for managing a social search over a network, comprising:

receiving a request for a social search for a user from a client device;

determining at least one target contact to query regarding the social search request;

querying the determined at least one target contact for a current social search response to the social search request;

determining at least one prior social search response that is relevant to the social search request and also relevant to a previously provided response associated with the determined at least one target contact based at least in part on an aggregated knowledge base of results for a plurality of social searches, wherein the aggregated knowledge base of results includes results from social searches of multiple users in a social network;

receiving at least one social search response that includes at least one of the at least one prior social search response or the current social search response that are associated with the determined at least one target contact;

sorting the at least one received social search response based on at least one relevancy characteristic, wherein each sorted social search response is provided in response to the social search request, and wherein the current social search response is provided to the user at a time later than the at least one prior social search response is provided to the user;

updating the aggregated knowledge base of results to include the at least one received social search response and at least a ranking or a categorization for at least one of the at least one received social search response, wherein each of the ranking or categorization is a ranking or categorization of a response;

determining at least one other prior social search response that is relevant to the social search request and associated with at least one other target contact referred to by the determined at least one target contact;

receiving the determined at least one other prior social search response associated with the at least one other target contact; and providing the sorted at least one received social search response to a user who requested the social search after an elapse of a predetermined period of time.

8. The method of claim 7, further comprising:

providing the social search request to at least one other target contact referred to by the determined at least one target contact, wherein the at least one other target contact is enabled to provide another current social search response; and receiving the other current social search response associated with the at least one other target contact, wherein the received other current social search response is sorted by at least one relevancy characteristic and provided in response to the social search request.

9. The method of claim 7, wherein the relevancy characteristic relates to an attribute of the target contact.

10. The method of claim 8, wherein the at least one other target contact has at least one or more degrees of separation from the at least one target contact.

11. The method of claim 7, further comprising:

providing the sorted at least one received social search response to a user who requested the social search, wherein the previously provided response is provided to a user before the current social search response.

12. A system for managing a message over a network, comprising:

a plurality of client devices, wherein each client device is configured to receive and send messages over the network; and a network device that is in communication with the plurality of client devices, and is configured and arranged to perform actions, including:

receiving a request for a social search from one client device in the plurality of client devices, for a user;

determining at least one target contact to query regarding the social search request;

querying the determined at least one target contact for a current social search response to the social search request, wherein each of the at least one target contact is associated with a different one client device in the plurality of client devices;

determining at least one prior social search response that is relevant to the social search request and also relevant to a previously provided response associated with the determined at least one target contact based at least in part on an aggregated knowledge base of results for a plurality of social searches, wherein the aggregated knowledge base of results includes results from social searches of multiple users in a social network;

receiving at least one social search response that includes at least one of the at least one prior social search response or the current social search response that are associated with the determined at least one target contact;

sorting the at least one received social search response based on at least one relevancy characteristic, wherein each sorted social search response is provided in response to the social search request, and wherein the current social search response is provided to the user at a time later than the at least one prior social search response is provided to the user; and updating the aggregated knowledge base of results to include the at least one received social search response and at least a ranking or a categorization for at least one of the at least one received social search response, wherein each of the ranking or categorization is a ranking or categorization of a response;

determining at least one other prior social search response that is relevant to the social search request and associated with at least one other target contact referred to by the determined at least one target contact;

receiving the determined at least one other prior social search response associated with the at least one other target contact; and providing the sorted at least one received social search response to a user who requested the social search after an elapse of a predetermined period of time.

13. The system of claim 12, further comprising:

providing the social search request to at least one other target contact referred to by the determined at least one target contact, wherein the at least one other target contact is enabled to provide another current social search response; and receiving the other current social search response associated with the at least one other target contact, wherein the received other current social search response is sorted by at least one relevancy characteristic and provided in response to the social search request.

14. The system of claim 12, further comprising:

associating at least one additional relevancy characteristic with the social search response; and storing the social search response and the associated at least one additional relevancy characteristic.

15. The system of claim 12, wherein the relevancy characteristic is a rating or ranking of the social search response.

16. A mobile device to manage communications over a network, comprising:

a transceiver to send and receive data over a network; and a processor that is operative to perform actions, comprising:

receiving a request for a social search for a user from the mobile device;

determining at least one target contact to query regarding the social search request;

querying the determined at least one target contact for a current social search response to the social search request;

determining at least one prior social search response that is relevant to the social search request and also relevant to a previously provided response associated with the determined at least one target contact based at least in part on an aggregated knowledge base of results for a plurality of social searches, wherein the aggregated knowledge base of results includes results from social searches of multiple users in a social network;

receiving at least one social search response that includes at least one of the at least one prior social search response or the current social search response that are associated with the determined at least one target contact;

sorting the at least one received social search response based on at least one relevancy characteristic, wherein each sorted social search response is provided in response to the social search request for display on the mobile device, and wherein the current social search response is provided to the user at a time later than the at least one prior social search response is provided to the user;

updating the aggregated knowledge base of results to include the at least one received social search response and at least a ranking or a categorization for at least one of the at least one received social search response, wherein each of the ranking or categorization is a ranking or categorization of a response;

determining at least one other prior social search response that is relevant to the social search request and associated with at least one other target contact referred to by the determined at least one target contact;

receiving the determined at least one other prior social search response associated with the at least one other target contact; and providing the sorted at least one received social search response to a user who requested the social search after an elapse of a predetermined period of time.

17. The mobile device of claim 16, further comprising:

storing the sorted at least one received social search response.

18. The mobile device of claim 16, further comprising:

providing the previously provided response to a user before providing any current social search response.

* * * * *

UNITED STATES PATENT AND TRADEMARK OFFICE
CERTIFICATE OF CORRECTION

PATENT NO. : 8,195,656 B2
APPLICATION NO. : 12/030715
DATED : June 5, 2012
INVENTOR(S) : Nicolas Grasset It is certified that error appears in the above-identified patent and that said Letters Patent is hereby corrected as shown below:

In column 21, line 34, in Claim 12, after "user;" delete "and".

Signed and Sealed this
Seventh Day of August, 2012

David J. Kappos
*Director of the United States Patent and Trademark Office*